(12) United States Patent
Maloney et al.

(10) Patent No.: US 7,571,890 B2
(45) Date of Patent: Aug. 11, 2009

(54) VALVE CONSTRUCTION AND METHOD OF USE

(75) Inventors: Patrick L. Maloney, Huffman, TX (US); Ricky W. Catchings, Hardin, TX (US)

(73) Assignees: Lyondell Chemical Technology, L.P., Greenville, DE (US); Equistar Chemicals, LP, Houston, TX (US)

( * ) Notice: Subject to any disclaimer, the term of this patent is extended or adjusted under 35 U.S.C. 154(b) by 393 days.

(21) Appl. No.: 11/704,007

(22) Filed: Feb. 8, 2007

(65) Prior Publication Data

US 2008/0190617 A1     Aug. 14, 2008

(51) Int. Cl.
F16K 51/00     (2006.01)
(52) U.S. Cl. .................. 251/60; 251/285; 251/286
(58) Field of Classification Search ........... 251/251, 251/285, 286, 59, 60; 92/13.5, 120; 91/469
See application file for complete search history.

(56) References Cited

U.S. PATENT DOCUMENTS

| | | | | |
|---|---|---|---|---|
| 3,688,645 A | * | 9/1972 | Reaves | ................ 251/59 |
| 5,054,374 A | * | 10/1991 | Scobie et al. | ............... 92/120 |
| 5,139,230 A | * | 8/1992 | Lester | .................. 251/285 |
| 5,190,263 A | * | 3/1993 | Roberts | ................. 92/13.5 |
| 5,259,589 A | * | 11/1993 | Posner | ................... 251/285 |
| 5,348,271 A | * | 9/1994 | Owen et al. | ................ 251/286 |
| 5,386,761 A | * | 2/1995 | Holtgraver | .............. 92/120 |
| 5,817,226 A | | 10/1998 | Lenglet | .................. 208/130 |
| 6,318,701 B1 | * | 11/2001 | Gardner | ................... 251/59 |
| 6,446,539 B1 | * | 9/2002 | Niessen | ................... 251/285 |
| 6,743,961 B2 | | 6/2004 | Powers | ................... 585/648 |
| 7,019,187 B2 | | 3/2006 | Powers | ................... 585/648 |

* cited by examiner

*Primary Examiner*—John Bastianelli
(74) *Attorney, Agent, or Firm*—Roderick W. MacDonald

(57) ABSTRACT

An actuated valve having a rotatable cam that controls an opening and closing disc and stop members for the cam, the cam having a notch that allows the cam to be stopped between fully open and fully closed, and an adjustable member on the stop member that corresponds with the notch that allows the cam to be rotated to the fully open or fully closed position. A method of thermally cracking at least one of whole crude oil and natural gas condensate using the actuated value.

4 Claims, 5 Drawing Sheets

VALVE CONSTRUCTION AND METHOD OF USE

BACKGROUND OF INVENTION

1. Field of the Invention

This invention relates to valve apparatus, more particularly, to butterfly valve construction. This invention is especially useful in processes that utilize whole crude oil and/or natural gas condensate as a feedstock for an olefin production plant that employs hydrocarbon thermal cracking in a pyrolysis furnace.

2. Description of the Prior Art

Thermal (pyrolysis) cracking of hydrocarbons is a non-catalytic petrochemical process that is widely used to produce olefins such as ethylene, propylene, butenes, butadiene, and aromatics such as benzene, toluene, and xylenes.

Basically, a hydrocarbon feedstock, such as naphtha, gas oil or other fractions of whole crude oil that are produced by distilling or otherwise fractionating whole crude oil, is mixed with steam which serves as a diluent to keep the hydrocarbon molecules separated. The steam/hydrocarbon mixture is preheated to from about 900 to about 1,000 degrees Fahrenheit (° F. or F), and then enters the reaction zone where it is very quickly heated to a severe hydrocarbon thermal cracking temperature in the range of from about 1,450 to about 1,550 F. Thermal cracking is accomplished without the aid of any catalyst.

This process is carried out in a pyrolysis furnace (steam cracker) at pressures in the reaction zone ranging from about 10 to about 30 psig. Pyrolysis furnaces have internally thereof a convection section and a radiant section. Preheating is accomplished in the convection section, while severe cracking occurs in the radiant section.

After severe thermal cracking, the effluent from the pyrolysis furnace contains gaseous hydrocarbons of great variety, e.g., from one to thirty-five carbon atoms per molecule. These gaseous hydrocarbons can be saturated, monounsaturated, and polyunsaturated, and can be aliphatic, alicyclics, and/or aromatic. The cracked gas also contains significant amounts of molecular hydrogen (hydrogen).

Thus, conventional steam (thermal) cracking, as carried out in a commercial olefin production plant, employs a fraction of whole crude and totally vaporizes that fraction while thermally cracking same. The cracked product can contain, for example, about 1 weight percent (wt. %) hydrogen, about 10 wt. % methane, about 25 wt. % ethylene, and about 17 wt. % propylene, all wt. % being based on the total weight of said product, with the remainder consisting mostly of other hydrocarbon molecules having from 4 to 35 carbon atoms per molecule.

The cracked product is then further processed in the olefin production plant to produce, as products of the plant, various separate individual streams of high purity such as hydrogen, ethylene, propylene, mixed hydrocarbons having four carbon atoms per molecule, fuel oil, and pyrolysis gasoline. Each separate individual stream aforesaid is a valuable commercial product in its own right. Thus, an olefin production plant currently takes a part (fraction) of a whole crude stream and generates therefrom a plurality of separate, valuable products.

Natural gas and whole crude oil(s) were formed naturally in a number of subterranean geologic formations (formations) of widely varying porosities. Many of these formations were capped by impervious layers of rock. Natural gas and whole crude oil (crude oil) also accumulated in various stratigraphic traps below the earth's surface. Vast amounts of both natural gas and/or crude oil were thus collected to form hydrocarbon bearing formations at varying depths below the earth's surface. Much of this natural gas was in close physical contact with crude oil, and, therefore, absorbed a number of lighter molecules from the crude oil.

When a well bore is drilled into the earth and pierces one or more of such hydrocarbon bearing formations, natural gas and/or crude oil can be recovered through that well bore to the earth's surface.

The terms "whole crude oil" and "crude oil" as used herein means liquid (at normally prevailing conditions of temperature and pressure at the earth's surface) crude oil as it issues from a wellhead separate from any natural gas that may be present, and excepting any treatment such crude oil may receive to render it acceptable for transport to a crude oil refinery and/or conventional distillation in such a refinery. This treatment would include such steps as desalting. Thus, it is crude oil that is suitable for distillation or other fractionation in a refinery, but which has not undergone any such distillation or fractionation. It could include, but does not necessarily always include, non-boiling entities such as asphaltenes or tar. As such, it is difficult if not impossible to provide a boiling range for whole crude oil. Accordingly, whole crude oil could be one or more crude oils straight from an oil field pipeline and/or conventional crude oil storage facility, as availability dictates, without any prior fractionation thereof.

Natural gas, like crude oil, can vary widely in its composition as produced to the earth's surface, but generally contains a significant amount, most often a major amount, i.e., greater than about 50 weight percent (wt. %), methane. Natural gas often also carries minor amounts (less than about 50 wt. %), often less than about 20 wt. %, of one or more of ethane, propane, butane, nitrogen, carbon dioxide, hydrogen sulfide, and the like. Many, but not all, natural gas streams as produced from the earth can contain minor amounts (less than about 50 wt. %), often less than about 20 wt. %, of hydrocarbons having from 5 to 12, inclusive, carbon atoms per molecule (C5 to C12) that are not normally gaseous at generally prevailing ambient atmospheric conditions of temperature and pressure at the earth's surface, and that can condense out of the natural gas once it is produced to the earth's surface. All wt. % are based on the total weight of the natural gas stream in question.

When various natural gas streams are produced to the earth's surface, a hydrocarbon composition often naturally condenses out of the thus produced natural gas stream under the then prevailing conditions of temperature and pressure at the earth's surface where that stream is collected. There is thus produced a normally liquid hydrocarbonaceous condensate separate from the normally gaseous natural gas under the same prevailing conditions. The normally gaseous natural gas can contain methane, ethane, propane, and butane. The normally liquid hydrocarbon fraction that condenses from the produced natural gas stream is generally referred to as "condensate," and generally contains molecules heavier than butane (C5 to about C20 or slightly higher). After separation from the produced natural gas, this liquid condensate fraction is processed separately from the remaining gaseous fraction that is normally referred to as natural gas.

Thus, condensate recovered from a natural gas stream as first produced to the earth's surface is not the exact same material, composition wise, as natural gas (primarily methane). Neither is it the same material, composition wise, as crude oil. Condensate occupies a niche between normally gaseous natural gas and normally liquid whole crude oil. Condensate contains hydrocarbons heavier than normally gaseous natural gas, and a range of hydrocarbons that are at the lightest end of whole crude oil.

Condensate, unlike crude oil, can be characterized by way of its boiling point range. Condensates normally boil in the range of from about 100 to about 650 degrees Fahrenheit (F). With this boiling range, condensates contain a wide variety of hydrocarbonaceous materials. These materials can include compounds that make up fractions that are commonly referred to as naphtha, kerosene, diesel fuel(s), and gas oil (fuel oil, furnace oil, heating oil, and the like). Naphtha and associated lighter boiling materials (naphtha) are in the C5 to C10, inclusive, range, and are the lightest boiling range fractions in condensate, boiling in the range of from about 100 to about 400 F. Petroleum middle distillates (kerosene, diesel, atmospheric gas oil) are generally in the C10 to about C20 or slightly higher range, and generally boil, in their majority, in the range of from about 350 to about 650 F. They are, individually and collectively, referred to herein as "distillate" or "distillates." It should be noted that various distillate compositions can have a boiling point lower than 350 F and/or higher than 650 F, and such distillates are included in the 350-650 F range aforesaid, and in this invention.

The starting feedstock for a conventional olefin production plant, as described above, normally has first been subjected to substantial, expensive processing before it reaches that plant. Normally, condensate and whole crude oil is distilled or otherwise fractionated in a crude oil refinery into a plurality of fractions such as gasoline, naphtha, kerosene, gas oil (vacuum or atmospheric) and the like, including, in the case of crude oil and not natural gas, a high boiling residuum. Thereafter any of these fractions, other than the residuum, are normally passed to an olefin production plant as the starting feedstock for that plant.

It would be desirable to be able to forego the capital and operating cost of a refinery distillation unit (whole crude processing unit) that processes condensate and/or crude oil to generate a hydrocarbonaceous fraction that serves as the starting feedstock for conventional olefin producing plants. However, the prior art, until recently, taught away from even hydrocarbon cuts (fractions) that have too broad a boiling range distribution. For example, see U.S. Pat. No. 5,817,226 to Lenglet.

Recently, U.S. Pat. No. 6,743,961 (hereafter "U.S. Pat. No. '961" issued to Donald H. Powers. This patent relates to cracking whole crude oil by employing a vaporization/mild cracking zone that contains packing. This zone is operated in a manner such that the liquid phase of the whole crude that has not already been vaporized is held in that zone until cracking/vaporization of the more tenacious hydrocarbon liquid components is maximized. This allows only a minimum of solid residue formation which residue remains behind as a deposit on the packing. This residue is later burned off the packing by conventional steam air decoking, ideally during the normal furnace decoking cycle, see column 7, lines 50-58 of that patent. Thus, the second zone 9 of that patent serves as a trap for components, including hydrocarbonaceous materials, of the crude oil feed that cannot be cracked or vaporized under the conditions employed in the process, see column 8, lines 60-64 of that patent.

Still more recently, U.S. Pat. No. 7,019,187 issued to Donald H. Powers. This patent is directed to the process disclosed in U.S. Pat. No. '961, but employs a mildly acidic cracking catalyst to drive the overall function of the vaporization/mild cracking unit more toward the mild cracking end of the vaporization (without prior mild cracking)-mild cracking (followed by vaporization) spectrum.

The disclosures of the foregoing patents, in their entirety, are incorporated herein by reference.

It has been found that, in carrying out the foregoing cracking process, the modification of a primary flow valve substantially improved the efficiency of that process. Although the valve of this invention is particularly useful in the foregoing cracking process, its industrial application is not so limited, the valve being useful in other processes as well, as will be obvious to one skilled in the art.

SUMMARY OF THE INVENTION

In accordance with this invention, there is provided a cam operated valve which cam has a notch therein that allows an adjustable stop member that corresponds with that notch to be moved into a position wherein, once the notch engages that stop member, the valve can be held at an opening intermediate its normal fully closed and fully open positions. The stop member of this invention carries an additional member for fixing that stop member in a position to halt the cam, depending on the valve configuration, in either of a fully open or fully closed orientation. The valve of this invention is particularly useful in the whole crude oil/condensate cracking process described here in above.

DETAILED DESCRIPTION OF THE INVENTION

Figure 1:
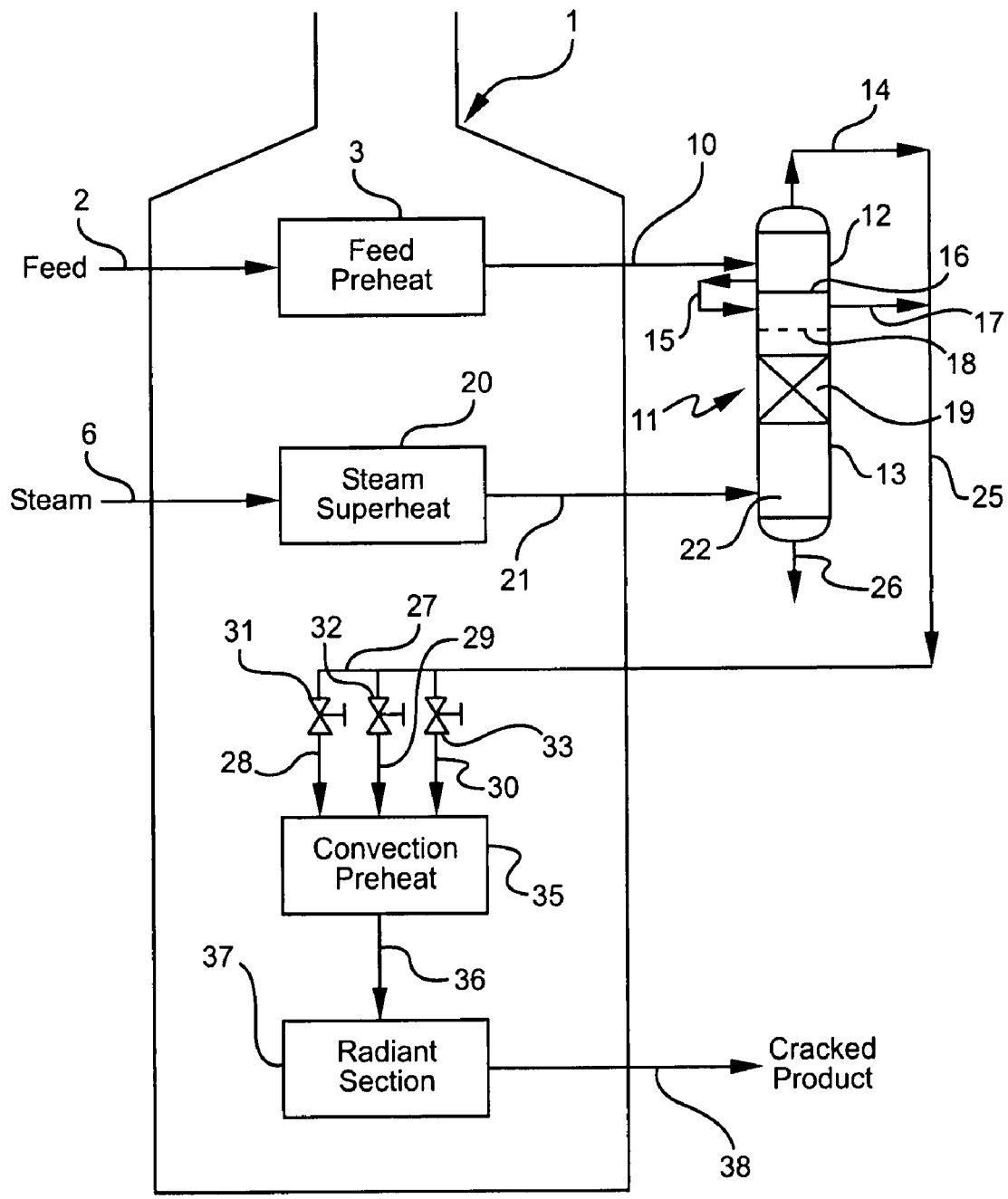
FIG. 1 shows a simplified flow sheet for the cracking process described here in above.

The terms "hydrocarbon," "hydrocarbons," and "hydrocarbonaceous" as used herein do not mean materials strictly or only containing hydrogen atoms and carbon atoms. Such terms include materials that are hydrocarbonaceous in nature in that they primarily or essentially are composed of hydrogen and carbon atoms, but can contain other elements such as oxygen, sulfur, nitrogen, metals, inorganic salts, and the like, even in significant amounts.

The term "gaseous" as used in this invention means one or more gases in an essentially vaporous state, for example, steam alone, a mixture of steam and hydrocarbon vapor, and the like.

An olefin producing plant useful with this invention would include a pyrolysis (thermal cracking) furnace for initially receiving and thermally cracking the feed. Pyrolysis furnaces for steam cracking of hydrocarbons heat by means of convection and radiation, and comprise a series of preheating, circulation, and cracking tubes, usually bundles of such tubes, for preheating, transporting, and cracking the hydrocarbon feed. The high cracking heat is supplied by burners disposed in the radiant section (sometimes called "radiation section") of the furnace. The waste gas from these burners is circulated through the convection section of the furnace to provide the heat necessary for preheating the incoming hydrocarbon feed. The convection and radiant sections of the furnace are joined at the "cross-over," and the tubes referred to hereinabove carry the hydrocarbon feed from the interior of one section to the interior of the next.

Cracking furnaces are designed for rapid heating in the radiant section starting at the radiant tube (coil) inlet where reaction velocity constants are low because of low temperature. Most of the heat transferred simply raises the hydrocarbons from the inlet temperature to the reaction temperature. In the middle of the coil, the rate of temperature rise is lower but the cracking rates are appreciable. At the coil outlet, the rate of temperature rise increases somewhat but not as rapidly as at the inlet. The rate of disappearance of the reactant is the product of its reaction velocity constant times its localized concentration. At the end of the coil, reactant concentration is low and additional cracking can be obtained by increasing the process gas temperature.

Steam dilution of the feed hydrocarbon lowers the hydrocarbon partial pressure, enhances olefin formation, and reduces any tendency toward coke formation in the radiant tubes.

Cracking furnaces typically have rectangular fireboxes with upright tubes centrally located between radiant refractory walls. The tubes are supported from their top.

Firing of the radiant section is accomplished with wall or floor mounted burners or a combination of both using gaseous or combined gaseous/liquid fuels. Fireboxes are typically under slight negative pressure, most often with upward flow of flue gas. Flue gas flow into the convection section is established by at least one of natural draft or induced draft fans.

Radiant coils are usually hung in a single plane down the center of the fire box. They can be nested in a single plane or placed parallel in a staggered, double-row tube arrangement. Heat transfer from the burners to the radiant tubes occurs largely by radiation, hence the thermo "radiant section," where the hydrocarbons are heated to from about 1,450° F. to about 1,550° F. and thereby subjected to severe cracking.

The initially empty radiant coil is, therefore, a fired tubular chemical reactor. Hydrocarbon feed to the furnace is preheated to from about 900° F. to about 1,000° F. in the convection section by convectional heating from the flue gas from the radiant section, steam dilution of the feed in the convection section, or the like. After preheating, in a conventional commercial furnace, the feed is ready for entry into the radiant section.

In a typical furnace, the convection section can contain multiple zones. For example, the feed can be initially preheated in a first upper zone, boiler feed water heated in a second zone, mixed feed and steam heated in a third zone, steam superheated in a fourth zone, and the final feed/steam mixture split into multiple sub-streams and preheated in the bottom, fifth zone. The number of zones and their functions can vary considerably.

The cracked gaseous hydrocarbons leaving the radiant section are rapidly reduced in temperature to prevent destruction of the cracking pattern. Cooling of the cracked gases before further processing of same downstream in the olefin production plant recovers a large amount of energy as high pressure steam for re-use in the furnace and/or olefin plant. This is often accomplished with the use of transfer-line exchangers that are well known in the art.

Downstream processing of the cracked hydrocarbons issuing from the furnace varies considerably, and particularly based on whether the initial hydrocarbon feed was a gas or a liquid. Since this invention uses whole crude oil and/or liquid natural gas condensate as a feed, downstream processing herein will be described for a liquid fed olefin plant. Downstream processing of cracked gaseous hydrocarbons from liquid feedstock, naphtha through gas oil for the prior art, and crude oil and/or condensate for this invention, is more complex than for gaseous feedstock because of the heavier hydrocarbon components present in the liquid feedstock.

With a liquid hydrocarbon feedstock downstream processing, although it can vary from plant to plant, typically employs an oil quench of the furnace effluent after heat exchange of same in, for example, the transfer-line exchanger aforesaid. Thereafter, the cracked hydrocarbon stream is subjected to primary fractionation to remove heavy liquids, followed by compression of uncondensed hydrocarbons, and acid gas and water removal therefrom. Various desired products are then individually separated, e.g., ethylene, propylene, a mixture of hydrocarbons having four carbon atoms per molecule, fuel oil, pyrolysis gasoline, and a high purity hydrogen stream.

The vaporization unit useful with this invention (for example section 3 of U.S. Pat. No. '961) receives the condensate feed that may or may not have been preheated, for example, from about ambient to about 350 F, preferably from about 200 to about 350 F. This is a lower temperature range than what is required for complete vaporization of the feed. Any preheating preferably, though not necessarily, takes place in the convection section of the same furnace for which such condensate is the primary feed.

Thus, the first zone in the vaporization operation step of this invention (zone 4 in U.S. Pat. No. '961) employs vapor/liquid separation wherein vaporous hydrocarbons and other gases, if any, in the preheated feed stream are separated from those distillate components that remain liquid after preheating. The aforesaid gases are removed from the vapor/liquid separation section and passed on to the radiant section of the furnace.

Vapor/liquid separation in this first, e.g., upper, zone knocks out distillate liquid in any conventional manner, numerous ways and means of which are well known and obvious in the art.

Liquid thus separated from the aforesaid vapors moves into a second, e.g., lower, zone (zone 9 in U.S. Pat. No. '961). This can be accomplished by external piping. Alternatively this can be accomplished internally of the vaporization unit. The liquid entering and traveling along the length of this second zone meets oncoming, e.g., rising, steam. This liquid, absent the removed gases, receives the full impact of the oncoming steam's thermal energy and diluting effect.

As the remaining liquid hydrocarbon travels through this second zone, lighter materials such as gasoline or naphtha that may be present can be vaporized in substantial part by the high energy steam with which it comes into contact. This enables the hydrocarbon components that are more difficult to vaporize to continue to fall and be subjected to higher and higher steam to liquid hydrocarbon ratios and temperatures to enable them to be vaporized by both the energy of the steam and the decreased liquid hydrocarbon partial pressure with increased steam partial pressure.

FIG. 1 shows one embodiment of the cracking process just described. FIG. 1 is very diagrammatic for sake of simplicity and brevity since, as discussed above, actual furnaces are complex structures. The other Figures are also simplified for sake of brevity, the electronic controls for such valves being complex, but also well known in the art.

FIG. 1 shows a conventional cracking furnace 1 wherein a crude oil/condensate primary feed 2 is passed in to a feed preheat section 3 of the convection section of furnace 1. Steam 6 is also superheated in the convection section of the furnace.

The pre-heated cracking feed stream is then passed by way of pipe (line) 10 to the aforesaid vaporization unit 11, which unit is separated into an upper vaporization zone 12 and a lower zone 13. This unit 11 achieves primarily (predominately) vaporization of at least a significant portion of the naphtha and gasoline boiling range and lighter materials that remain in the liquid state after the pre-heating step. Gaseous materials that are associated with the preheated feed as received by unit 11, and additional gaseous materials formed in zone 12, are removed from zone 12 by way of line 14. Thus, line 14 carries away essentially all the lighter hydrocarbon vapors, e.g., naphtha and gasoline boiling range and lighter, that are present in zone 12. Liquid distillate present in zone 12, with or without some liquid gasoline and/or naphtha, is removed therefrom via line 15 and passed into the upper interior of lower zone 13. Zones 12 and 13, in this embodiment, are separated from fluid communication with one another by an impermeable wall 16, which can be a solid tray. Line 15 represents external fluid down flow communication between zones 12 and 13. In lieu thereof, or in addition thereto, zones 12 and 13 can have internal fluid communication there between by modifying wall 16 to be at least in part liquid permeable by use of one or more trays designed to allow liquid to pass down into the interior of zone 13 and vapor up into the interior of zone 12. For example, instead of an impermeable wall 16, a chimney tray could be used in which case vapor carried by line 17 would pass internally within unit 11 down into section 13 instead of externally of unit 11 via line 15. In this internal down flow case, distributor 18 becomes optional.

By whatever way liquid is removed from zone 12 to zone 13, that liquid moves downwardly into zone 13, and thus can encounter at least one liquid distribution device 18. Device 18 evenly distributes liquid across the transverse cross section of unit 11 so that the liquid will flow uniformly across the width of the tower into contact with packing 19.

Dilution steam 6 passes through superheat zone 20, and then, via line 21 in to a lower portion 22 of zone 13 below packing 19. In packing 19 liquid and steam from line 21 intimately mix with one another thus vaporizing some of liquid 15. This newly formed vapor, along with dilution steam 21, is removed from zone 13 via line 17 and added to the vapor in line 14 to form a combined hydrocarbon vapor product in line 25. Stream 25 can contain essentially hydrocarbon vapor from feed 2, e.g., gasoline and naphtha, and steam.

Stream 17 thus represents a part of feed stream 2 plus dilution steam 21 less liquid distillate(s) and heavier from feed 2 that are present in bottoms stream 26. Stream 25 is passed through a header 27 whereby stream 25 is split into multiple sub-streams 28 through 30, inclusive. In actuality, more than three sub-streams can be employed, the three shown in the Figure being merely representative. Each pipe 28 through 30 carries a butterfly valve 31 through 33, inclusive. Valves 31 through 33 are the valves of this invention.

The header pipe carrying stream 25 is large in diameter, and each of pipes 28 through 30 is much smaller in diameter than pipe 25. Valves 31 through 33 are employed in lines 28 through 30, and are made variable in the manner of this invention in order to obtain even distribution of flow of stream 27 between each of the smaller lines 28 through 30. Thus, in operation, each of valves 31 through 33 will, in most cases, initially be put at a flow admission setting that is different from the other valves. After even flow has been established through lines 28 through 30, the initial flow settings of various of valves 31 through 33 will be changed from time to time during continued operation in order to maintain even flow through all of pipes 28 through 30 throughout the operation life of the plant.

Streams 28 through 30 then pass into a convection section preheat zone 35 of furnace 1. Thereafter, the streams pass to the radiant section 37 of furnace 1. The individual streams that pass from section 35 to section 37 are represented by a single flow stream 36 for sake of brevity.

In the radiant firebox section of furnace 1, feed from line 36, which contains numerous varying hydrocarbon components, is subjected to severe thermal cracking conditions as aforesaid.

The cracked product leaves the radiant fire box section of furnace 1 by way of line 38 for further processing in the remainder of the olefin plant downstream of furnace 1 as shown in U.S. Pat. No. '961.

Feed 2 can enter furnace 1 at a temperature of from about ambient up to about 300 F at a pressure from slightly above atmospheric up to about 100 psig (hereafter "atmospheric to 100 psig"). Feed 2 can enter zone 12 via line 10 at a temperature of from about ambient to about 500 F at a pressure of from atmospheric to 100 psig.

Stream 14 can be essentially all hydrocarbon vapor formed from feed 2 and is at a temperature of from about ambient to about 700 F at a pressure of from atmospheric to 100 psig.

Stream 15 can be essentially all the remaining liquid from feed 2 less that which was vaporized in pre-heater 3 and is at a temperature of from about ambient to about 500 F at a pressure of from slightly above atmospheric up to about 100 psig (hereafter "atmospheric to 100 psig").

The combination of streams 14 and 17, as represented by stream 25, can be at a temperature of from about 170 to about 400 F at a pressure of from atmospheric to 100 psig, and contain, for example, an overall steam/hydrocarbon ratio of from about 0.1 to about 2, preferably from about 0.1 to about 1, pounds of steam per pound of hydrocarbon.

In zone 13, dilution ratios (hot gas/liquid droplets) will vary widely because the composition of condensate varies widely. Generally, the hot gas 21, e.g., steam, to hydrocarbon ratio at the top of zone 13 can be from about 0.1/1 to about 5/1, preferably from about 0.1/1 to about 1.2/1, more preferably from about 0.1/1 to about 1/1.

Steam is an example of a suitable hot gas introduced by way of line 21. Other materials can be present in the steam employed. Stream 6 can be that type of steam normally used in a conventional cracking plant. Such gases are preferably at a temperature sufficient to volatilize a substantial fraction of the liquid hydrocarbon 15 that enters zone 13. Generally, the gas entering zone 13 from conduit 21 will be at least about 350 F, preferably from about 650 to about 1,000 F at from atmospheric to 100 psig. Such gases will, for sake of simplicity, hereafter be referred to in terms of steam alone.

Stream 17 can be a mixture of steam and hydrocarbon vapor that has a boiling point lower than about 350 F. It should be noted that there may be situations where the operator desires to allow some distillate to enter stream 17, and such situations are within the scope of this invention. Stream 17 can be at a temperature of from about 170 to about 450 F at a pressure of from atmospheric to 100 psig.

Steam from line 21 does not serve just as a diluent for partial pressure purposes as does diluent steam that may be introduced, for example, into conduit 2 (not shown). Rather, steam from line 21 provides not only a diluting function, but also additional vaporizing energy for the hydrocarbons that remain in the liquid state. This is accomplished with just sufficient energy to achieve vaporization of heavier hydrocarbon components and by controlling the energy input. For example, by using steam in line 21, substantial vaporization of feed 2 liquid is achieved. The very high steam dilution ratio and the highest temperature steam are thereby provided where they are needed most as liquid hydrocarbon droplets move progressively lower in zone 13.

Figure 2:
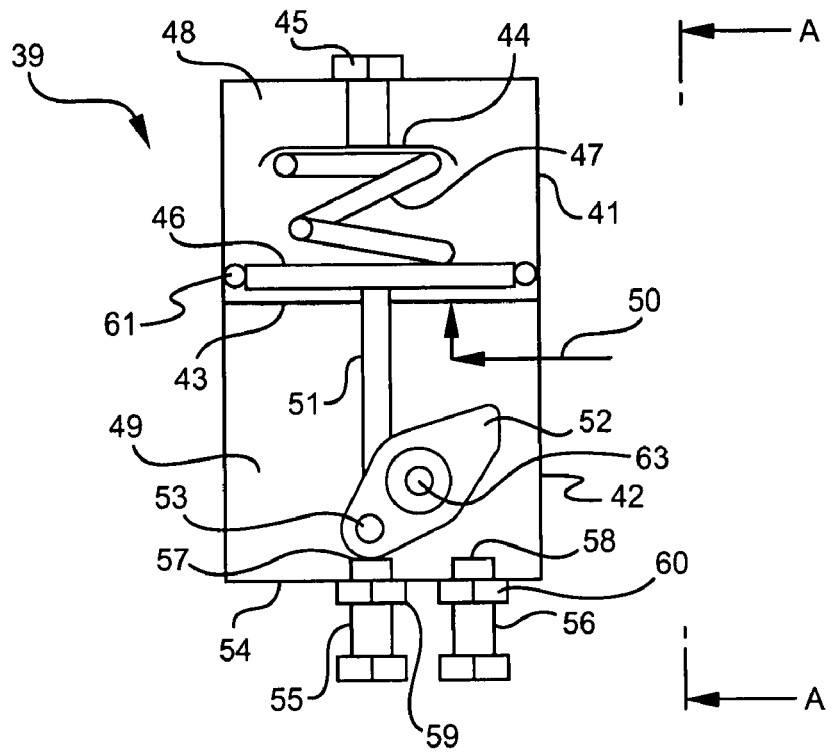
FIG. 2 shows the interior of a prior art cam operated butterfly valve that can be modified to utilize the benefits of this invention.

FIG. 2 shows a simplified interior construction for a rotary, fluid actuated valve 39 that can be modified to take advantage of the benefits of this invention, and, when so modified, can be employed as any one or all of valves 31 through 33 of FIG. 1. Although disclosed hereinafter as a normally open (fail-open) valve, the valve of this invention can also be configured to be a fluid-to-open/fail-closed valve as well as the fluid-to-close/fail-open valve described hereinafter.

FIG. 2 shows a butterfly valve 40 having an upper casing 41 and lower joined casing 42 divided by a fluid tight (impermeable) wall 43. Upper casing 41 carries in its interior 48 a spring 47 that is compressed between an upper assembly composed of spring holder 44 and bolt 45, and a lower piston 46. Piston 46 carries a piston ring 61 to separate the interior portion of casing 41 below piston 46 from the interior portion of casing 41 above piston 46 in a fluid tight manner. Thus, when a fluid, e.g., air or hydraulic fluid, is introduced by way of line 50 into the interior of casing 41 below piston 46, piston 46 is moved upwardly against the natural downward bias of spring 47.

In the interior of upper casing 41, piston rod 51 is fixed to piston 46. Rod 51 passes through wall 43 in a fluid tight manner, and, in the interior 49 of casing 42, connects with cam 52 in a movable (rotating) manner by way of shaft 53. Bottom wall 54 of casing 42 carries two spaced apart stop members 55 and 56 which threadably engage bottom 54 so that they can extend from the exterior of casing 42 into the interior 49 of casing 42 in a movable (adjustable) manner. Members 55 and 56 carry on the exterior of casing 42 adjustable members, 59 and 60, respectively, that can be used to fix each of members 55 and 56 in place once their upper bearing surfaces 57 and 58 are adjusted to be in a position in the interior of casing 42 that is at the desired height to stop the rotation of cam 52 in either the fully open or fully closed configuration.

It would at first appear that to configure the valve of FIG. 2 to stop the rotation of cam 52 in an intermediate position between fully open and fully closed, all that would be required would be to raise one of stop members 55 or 56 upwardly into the interior of casing 42 so that the cam will engaged that raised member earlier than normal. However, it has been found that this is not the case between the normal valve settings of 15 percent closed and 85 percent open, i.e., above 15 percent closed and below 85 percent open. This is particularly so in the cracking process described hereinabove because of the large volumes of fluid carried by pipes 28 through 30 (FIG. 1). What happens when cam 52 is stopped by either of stops 55 or 56 in an intermediate position between fully open and fully closed is cam 52, being curvilinear, engages the flat upper surfaces 57 or 58 at an angle that can result in damage to the cam and/or bending of the stop member (55 or 56) itself. Also, when one of stop members 55 or 56 is raised into the interior of casing 42 higher than its fully open or closed configuration, its corresponding adjustable member 59 or 60 must be backed off to allow the stop member to move further into the interior of casing 42 to attain an intermediate stop position. Once this corresponding adjustable member has been backed off, there is no stop means to which the stop member can later be moved to engage in order to position that stop member back at its original fully open or fully closed operating height inside casing 42.

Figure 3:
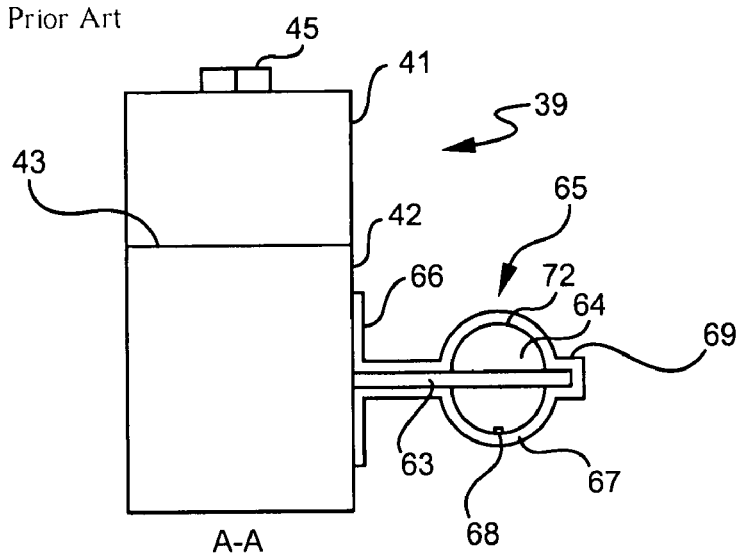
FIG. 3 shows side A-A of the valve of FIG. 2, which side carries the valve's butterfly disc that is disposed inside the associated pipe whose internal flow the disc is to control.
Figure 6:
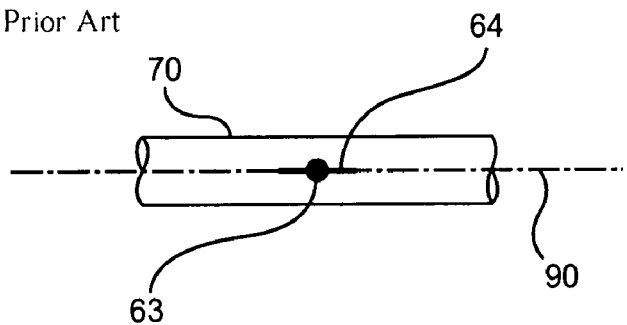
FIG. 6 shows the relationship of the disc of the valve of FIG. 2 with its associated pipe when the valve is in its fully open configuration.

FIG. 3 shows valve 39 from view A-A of FIG. 2, and further shows how that valve carries its butterfly disc that will be engaged with a pipe (not shown, see FIG. 4) whose flow that disc is to control by operation of valve 39. Cam 52 (FIG. 2) is rigidly fixed, e.g., splined, to shaft 63 which extends from interior 49 of casing 42 (FIG. 2) to the exterior of that casing. Shaft 63 carries in a fixed manner a butterfly disc 64 which will be disposed internally of the pipe whose flow it is to control (FIG. 6).

The shaft 63/disc 64 assembly is carried internally of an enclosing member 65. Member 65 carries first flange means 66 for fixing member 65 to casing 42, and spaced apart second flange means 67. Flange 67 mates with opposing ends of pipe sections (not shown, see FIG. 4) that will contain the stream whose flow disc 64 is to control. The distal end of shaft 63 is journaled into the far end 69 of member 65 for rotating support of shaft 63 at that end. Flange 67 carries a shoulder 68 against which disc 64 is held when valve 39 is in the fully closed configuration. Disc 64 has an overall outer diameter just slightly smaller than the internal diameter of the pipe into which disc 64 is to be inserted (see FIG. 4). Disc 64 carries a seal member (not shown) that seals, in a fluid tight manner, the outer peripheral edge 72 of disc 64 and the inner surface of the pipe in which that disc is contained. Accordingly, when disc 64 is moved into engagement with shoulder 68, the pipe in which that disc is carried is closed, and the flow of fluid there through stopped.

Figure 4:
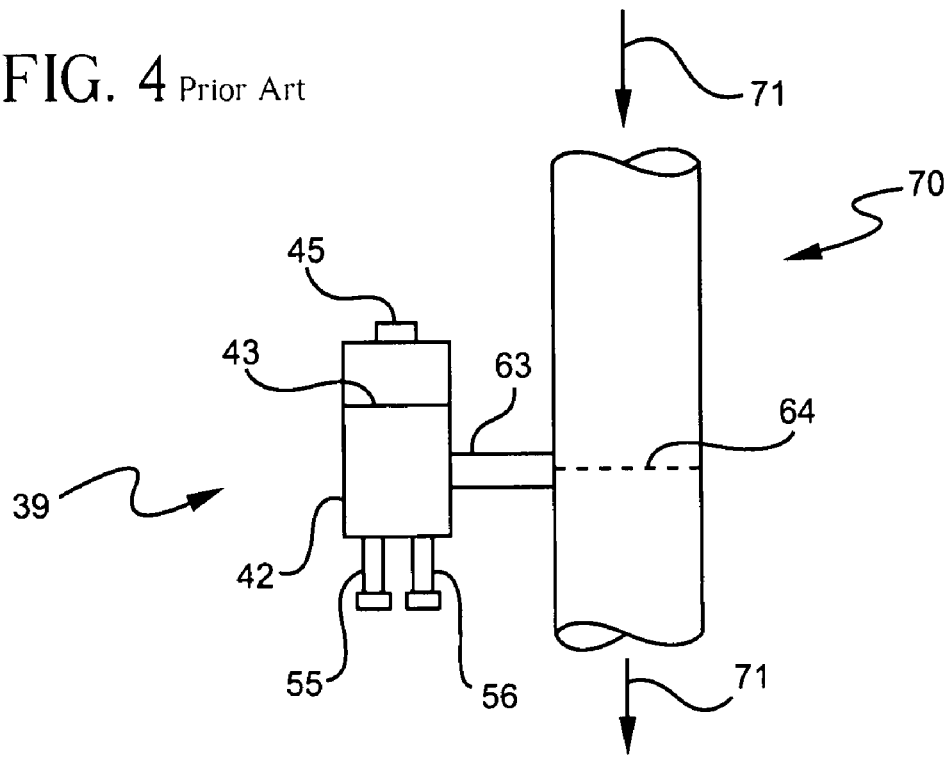
FIG. 4 shows the operating relationship of the valve of FIG. 2 to its associated pipe whose internal flow the valve is to control.

FIG. 4 shows the assembly of FIG. 3 when operationally fixed to pipe 70 whose flow stream 71, disc 64 is to control by operation of valve 39. Member 65 of FIG. 3 is not shown in FIG. 4 for sake of clarity. In reality, pipe 70 is separated and flange 67 of member 65 (FIG. 3) interposed between the separated, opposing ends of pipe 70. Member 65 is fixed in pipe 71 in a fluid tight manner so that flange 67 becomes an integral part of pipe 70. In this manner, disc 64 is disposed, in a fluid tight manner, wholly in the interior of pipe 70 where stream 71 flows when pipe 70 is in operation.

Figure 5:
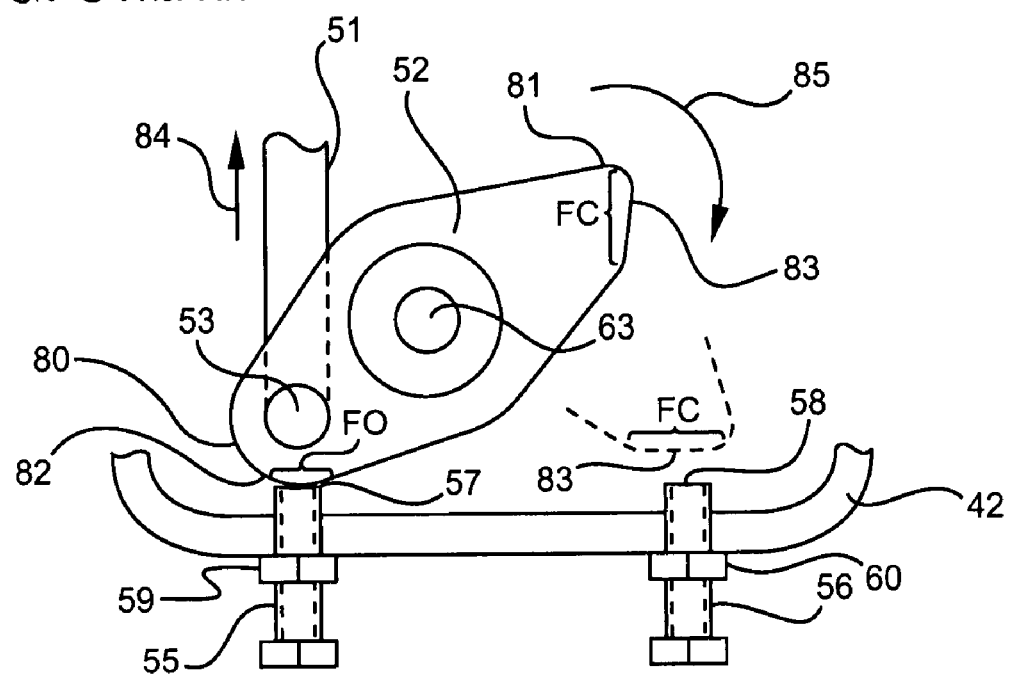
FIG. 5 shows an enlarged section of the cam of FIG. 2.

FIG. 5 is an enlarged view of the cam assembly of FIG. 2. Cam 52 is a rotatable, elongate, curvilinear member having opposed longitudinal ends 80 and 81. Ends 80 and 81 each carry a flattened bearing surface 82 (fully open surface or FO) and 83 (fully closed surface or FC), respectively. Surfaces 82 and 83 engage (mate with) their corresponding stop member bearing surfaces 57 and 58, respectively. For example, when surface 82 abuts surface 57, as is essentially primarily shown in FIG. 5, disc 64 is essentially parallel to the long axis of pipe 70, and valve 39 is in the fully open (FO) configuration (see FIG. 6). Conversely, when valve 39 is in the fully closed (FC) configuration sufficient fluid 50 (FIG. 2) has been introduced into the interior of casing 41 below piston 46 to overcome the normal downward bias of spring 47 thereby raising piston rod 51 as shown by arrow 84 to an extent that cam 52 rotates clockwise, arrow 85, until fully closed surface 83 of cam 52 engages flat bearing surface 58 (see dotted representation in FIG. 5). In this configuration valve 39 is fully closed (see FIG. 7), and remains so as long as pressurized fluid is maintained in the interior of casing 41 below piston 46.

FIG. 6 shows disc 64 in its fully open (FO) position, i.e., essentially parallel with the long axis 90 of pipe 70 and its flow stream 71 (FIG. 4).

Figure 7:
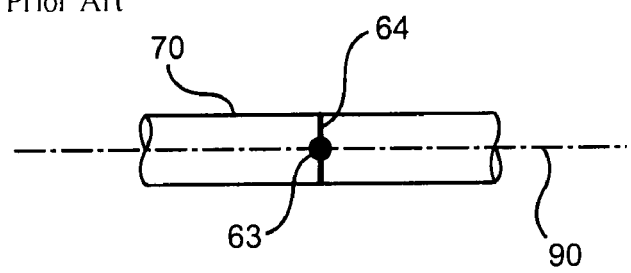
FIG. 7 shows the relationship of the disc of FIG. 6 when in the fully closed configuration.

FIG. 7 shows disc 64 in its fully closed (FC) position, i.e., essentially perpendicular to the long axis 90 of pipe 70 and its flow stream 71 (FIG. 4).

Figure 8:
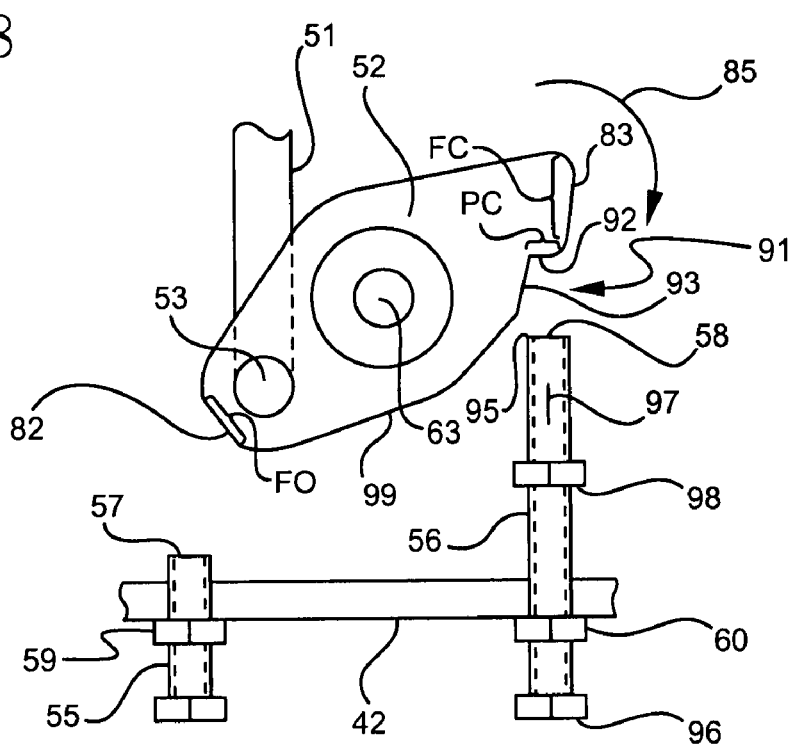
FIG. 8 shows the cam of FIG. 2 modified in accordance with this invention.

FIG. 8 shows cam 52 modified pursuant to this invention. The first modification of this invention is to form a notch 91 in the side of cam 52 nearest to its corresponding stop member 56, and near the longitudinal, fully closed end 83 of cam 52. In the alternative, in lieu of notch 91 or in addition to notch 91, a similar notch (not shown) could be formed in the under side of cam 52 near longitudinal, fully open cam end 82. More than one such notch can be employed near a given longitudinal cam end. Any combination of these features is within the scope of this invention.

Notch 91 is composed of two sides, first side 92 and second side 93.

First side 92 extends essentially laterally (essentially horizontally) into the body of cam 52 to provide an essentially flat bearing surface that will mate with surface 58 of its corresponding stop member 56, thereby providing solid flat-to-flat area engagement of these two surfaces without imparting a bending moment to stop member 56.

Second side 93 extends essentially uprightly inwardly into the body of cam 52 until it meets side 92. However, this alone will not accomplish the benefits of this invention. In the second modification of this invention, second side 93 is deliberately angled away from first side 92 in an obtuse angle B (FIG. 9) in order to avoid destructive physical contact between the upper edge 95 of member 56 and cam 52 as first side 92 is moved toward surface 58. This way, cam 52 can be rotated counter clockwise 85 until first side 92 firmly mates with surface 58 in a uniform manner that essentially mates the full area of side 92 with the full area of surface 58 for maximum essentially vertical bearing force, and with little or no lateral force applied to member 56 over its long axis 97. By following the teachings of this invention, there is essentially no risk of contact of cam 52 with member 56 while moving first side 92 into contact with surface 58. Nor is there risk of bending or otherwise deflecting member 56 from an essentially vertical stance, however long side 92 and surface 58 are maintained in physical contact. Thus, by this invention valve 39 and its disc 64 can be moved into one or more intermediate positions between fully open and fully closed, and maintained in that position for as long as desired with no damage to cam 52 or stop member 56.

Figure 9:
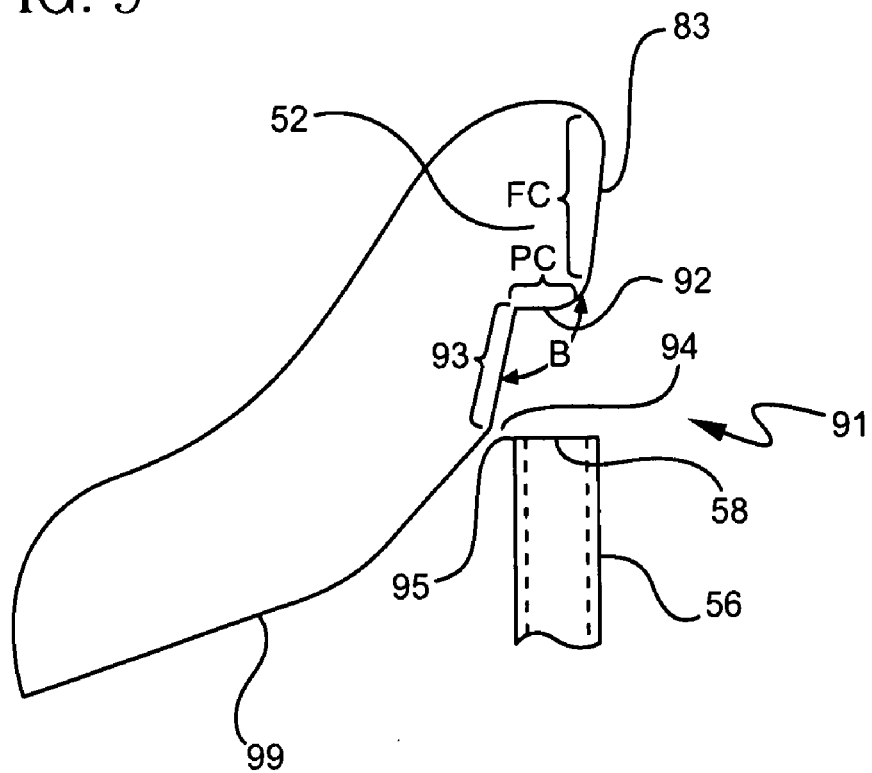
FIG. 9 shows an enlarged section of the modified cam of FIG. 8 and its operating relation to its corresponding stop member, which stop member has also been modified pursuant to this invention.

As stated above, when member 56 is moved upwardly into the interior of casing 42, adjustable member (nut) 60 must be backed off (unscrewed) toward bolt end 96. This effectively removes the function that member 60 previously performed, i.e., serving, by abutment with casing 42 on its exterior (FIG. 5) to fix surface 58 at a height that is correct for mating with surface 83, i.e., the fully closed position for cam 52. Pursuant to the third modification of this invention, a second adjustable member (nut) 98 is positioned on stop member 56 in the interior of casing 42 to serve to fix surface 58 at a height that is correct for mating with surface 83, i.e., the fully closed position for cam 52. Thus, pursuant to this invention, exterior prior art member 60 serves the new function of fixing member 56 at a height so that notch side 92 will engage surface 58, while new and additional adjustable member 98 serves, in interior 49 (FIG. 2), the new and additional function of fixing member 56 at a height so that FC surface 83 will engage stop member surface 58. Member 98 is required in order to provide a setting for fully closing the valve before disc 64 comes into physical contact with stop 68. If disc 64 actually contacts stop 68 the pressure from spring 47 could bend either or both of rod 51 or shaft 63. During start up the valve is normally closed with surface 83 abutting surface 58. During operation, the valve can have a 50 percent opening stop when surface 92 is brought into abutment with surface 58. With the movement of member 56 along its longitudinal axis 97 between stop members 60 and 98, an easy transition can be made by the plant operator between the fully closed valve position and the 50 percent open valve position FIG. 9 shows an enlargement of FIG. 8. FIG. 8 shows that point in time in the clockwise rotation 85 of cam 52 when its outer surface 99 is first approaching edge 95 of member 56. If notch side 93 was not deliberately cut at angle B, pursuant to the teachings of this invention, edge 95 would contact curvilinear outer surface 99 before side 92 reached surface 58. This would damage cam 52. It would also apply a bending moment to the long axis 97 of member 56 that could deform (bend) member 56, particularly when held in place for an extended period of time. The deliberate angling of side 93 pursuant to this invention prevents such damage from occurring. Accordingly, angle B is deliberately chosen so that a gap 94 is maintained between cam surface 99 and edge 95 until surface 58 becomes squarely (evenly) mated with side 92, preferably over the full bearing areas of both side 92 and surface 58

Figure 10:
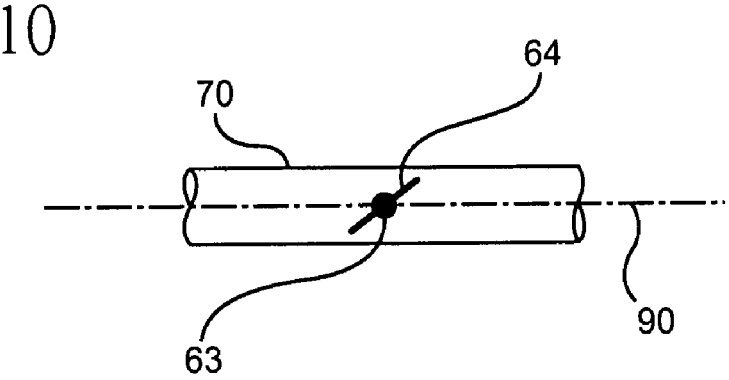
FIG. 10 shows the relationship of the disc of FIG. 6 with its associated pipe when the notch in the cam of FIG. 9 has fully engaged its associated stop member and the valve fixed at an operating configuration that is between fully open and fully closed.

FIG. 10 shows the orientation of disc 64 inside pipe 70 when side 92 of notch 91 has engaged surface 58 of its corresponding stop member 56, and the rotation 85 of cam 52 stopped. In this configuration the orientation of disc 64 is between (intermediate) fully open and fully closed. Thus, valve 39 is partially closed (PC). Depending on the location and number of notches employed, and the exact angle B, the extent of intermediate closing settings can vary widely. Intermediate setting(s) are preferably between from about 15 to about 85 percent of fully open. Generally, angle B will be greater than 90 degrees.

EXAMPLE

A natural gas condensate stream 5 characterized as Oso condensate from Nigeria is removed from a storage tank and fed directly into the convection section of a pyrolysis furnace 1. This feed is at ambient conditions of temperature and pressure. In this convection section this condensate initial feed is preheated to about 350 F at about 60 psig, and then passed into a vaporization unit 11 wherein a mixture of gasoline and naphtha gases at about 350 F and 60 psig are separated from distillate liquids in zone 12 of that unit. The separated gases are removed from zone 12 for transfer to the convection preheat section of the same furnace for ultimate severe cracking in a temperature range of 1,450° F. to 1,550° F. in radiant section 37.

The hydrocarbon liquid remaining from feed 2, after separation from accompanying hydrocarbon gases aforesaid, is transferred to lower section 13 and allowed to fall downwardly in that section toward the bottom thereof. Preheated steam 21 at about 1,000 F is introduced near the bottom of zone 13 to give a steam to hydrocarbon ratio in section 22 of about 0.5. The falling liquid droplets are in counter current flow with the steam that is rising from the bottom of zone 13 toward the top thereof. With respect to the liquid falling downwardly in zone 13, the steam to liquid hydrocarbon ratio increases from the top to bottom of section 19.

A mixture of steam and naphtha vapor 17 at about 340 F is withdrawn from near the top of zone 13 and mixed with the gases earlier removed from zone 12 via line 14 to form a composite steam/hydrocarbon vapor stream 25 containing about 0.5 pounds of steam per pound of hydrocarbon present. This composite stream is split into multiple sub-streams 28 through 30 and passed through valves 31 through 33 of this invention to be preheated in zone 35 to about 1,000 F at less than about 50 psig, and then introduced into the radiant firebox section 37.

Bottoms product 26 of unit 11 is removed at a temperature of about 460 F, and pressure of about 60 psig, and passed to an atmospheric distillation unit.

We claim:

1. In an actuated valve having a casing that carries a rotatable elongate curvilinear cam that has opposing longitudinal ends, said valve carrying spaced apart corresponding stop members in proximity to said cam so that said opposing longitudinal ends of said cam can be rotated into contact with their corresponding stop member, at least one of said stop members being movable toward said cam and then fixed in place, said cam having a surface at each opposing longitudinal end which mates with its corresponding stop member to hold said valve fully open or fully closed, said cam carrying a shaft and disc assembly so that when said cam is rotated said shaft rotates said disc to render said valve either fully open or fully closed, the improvement comprising said cam having at least one notch nearer a at least one longitudinal end and facing said stop member that corresponds with said at least one longitudinal end, said at least one notch having at least first and second sides, said first side extending essentially laterally inwardly into said cam to provide an essentially flat bearing surface to mate with said corresponding stop member when said stop member is positioned toward said cam, said second side extending essentially uprightly inwardly into said cam at an angle from said first side, said angle being sufficient to provide physical spacing of said cam from said corresponding stop member during rotation of said cam so that said cam does not contact said corresponding stop member before said first side comes into contact with said corresponding stop member, and a member carried by said corresponding stop member for fixing said stop member in a position to stop said cam in one of a fully open or fully closed position.

2. The apparatus of claim 1 wherein said first notch side extends essentially horizontally, said second side extends essentially vertically, and said angle is obtuse.

3. The apparatus of claim 1 wherein said valve has a casing with an interior and exterior and said cam is carried in said interior, said stop member that corresponds with said notch is movable through said casing and extends from said exterior to said interior so that said movable stop member can be moved into said interior towards said cam, said movable stop member carries a first adjustable member on said exterior of said casing for fixing said movable stop member in said interior so that it will engage said notch, said movable stop member carrying a second adjustable member in said interior of said casing for fixing said movable stop member in said interior so that it will not engage said notch and instead will engage said mating surface of said corresponding longitudinal end of said cam.

4. The apparatus of claim 3 wherein said movable stop member is threaded through said casing.

* * * * *